(12) United States Patent
Abramov (10) Patent No.: US 12,056,960 B2
(45) Date of Patent: Aug. 6, 2024

(54) SYSTEM AND METHOD FOR MONITORING AND PREDICTING BREAKDOWNS IN VEHICLES

(71) Applicant: D.S. RAIDER LTD, Kefar-Saba (IL)

(72) Inventor: Erez Abramov, Moshav Hagor (IL)

(73) Assignee: D.S. RAIDER LTD, Kefar-Saba (IL)

( * ) Notice: Subject to any disclaimer, the term of this patent is extended or adjusted under 35 U.S.C. 154(b) by 69 days.

(21) Appl. No.: 16/952,537

(22) Filed: Nov. 19, 2020

(65) Prior Publication Data

US 2021/0150827 A1 May 20, 2021

Related U.S. Application Data

(60) Provisional application No. 62/937,356, filed on Nov. 19, 2019.

(51) Int. Cl.
*G07C 5/00* (2006.01)
*G06N 20/00* (2019.01)
(Continued)

(52) U.S. Cl.
CPC ............ *G07C 5/006* (2013.01); *G06N 20/00* (2019.01); *G06Q 10/20* (2013.01); *G07C 5/0816* (2013.01)

(58) Field of Classification Search
None
See application file for complete search history.

(56) References Cited

U.S. PATENT DOCUMENTS 5,014,810 A * 5/1991 Mattes ................ B60R 21/0133
280/806
9,714,037 B2 * 7/2017 DeRuyck ............... B60W 50/14
(Continued)

FOREIGN PATENT DOCUMENTS

DE 102018003801 A1 11/2018
WO WO03061235 A2 * 7/2003 ............. H04L 29/00
(Continued)

OTHER PUBLICATIONS

L. M. Bergasa, D. Almería, J. Almazán, J. J. Yebes and R. Arroyo, "DriveSafe: An app for alerting inattentive drivers and scoring driving behaviors," 2014 IEEE Intelligent Vehicles Symposium Proceedings, 2014, pp. 240-245, doi: 10.1109/IVS.2014.6856461. (Year: 2014).*
(Continued)

*Primary Examiner* — Paul R Fisher
(74) *Attorney, Agent, or Firm* — BROWDY AND NEIMARK, P.L.L.C.

(57) ABSTRACT

The present provides a method for condition monitoring a vehicle and for alerting of irregularities/defects.
The method comprises the steps of:
monitoring sensory data from multiple sensors;
collecting data continuously from said sensors;
processing said data;
applying machine learning algorithms at an online remote server configured to incorporate all the acquired sensory data and
providing an output sending/receiving a notification of a malfunction event;
wherein applying said machine learning algorithms comprising applying at least one of the following models:
(d) model I—trained to learn the behavior of said acquired sensory data and to identify malfunction (s) based on said sensory data;
(e) model II—trained to learn the behavior of said acquired sensory data and to identify an exceptional event based on said sensory data and optionally based on human feedback; and
(f) model III—trained to learn the behavior of said acquired sensory data and to identify upcoming malfunctions based on said sensory data.

15 Claims, 8 Drawing Sheets

Event identification module 620

Collecting via multiple sensors changes in different patterns of data t, such as changes in patterns of noise, changes in acceleration data and the like 6202

Identifying sudden exceptional changes during a short period of time in acoustic sensor measurements, G-Sensor measurements or any other sensors 6204

Comparing the sensor data with the sudden exceptional changes to stored known patterns of sensor data such as of noise data or acceleration data which represent a type of driving event 6206

Determining the occurrence of an exceptional event type based on identified changes in sensor data, the pattern of noise which matches the measurement with the sudden change, and thus, determining the scenario(s) causing the sudden change 6208

Creating an artificial intelligence (AI) model II to identify an exceptional event based on sensory data and optionally based on human feedback from multiple vehicles 6210

(51) Int. Cl.
 G06Q 10/20 (2023.01)
 G07C 5/08 (2006.01)

(56) References Cited

U.S. PATENT DOCUMENTS

| | | | |
|---|---|---|---|
| 10,072,933 B1 * | 9/2018 | Surpi | G01S 19/47 |
| 10,086,782 B1 * | 10/2018 | Konrardy | G08G 1/096725 |
| 10,354,462 B1 | 7/2019 | Zhang et al. | |
| 10,497,185 B2 * | 12/2019 | Hanov | G07C 5/006 |
| 11,270,528 B2 * | 3/2022 | Hanov | G07C 5/006 |
| 2006/0047382 A1 * | 3/2006 | Morioka | G07C 5/008 |
| | | | 701/31.9 |
| 2006/0217864 A1 * | 9/2006 | Johnson | B60R 21/0152 |
| | | | 701/45 |
| 2007/0035114 A1 * | 2/2007 | Breed | B60R 21/0152 |
| | | | 180/271 |
| 2008/0249667 A1 * | 10/2008 | Horvitz | B60W 40/072 |
| | | | 701/1 |
| 2009/0099719 A1 * | 4/2009 | Namuduri | G01M 17/04 |
| | | | 701/29.4 |
| 2016/0035150 A1 * | 2/2016 | Barfield, Jr. | G05B 23/0254 |
| | | | 701/29.3 |
| 2016/0153806 A1 | 6/2016 | Ciasulli et al. | |
| 2017/0176192 A1 * | 6/2017 | Cardoso de Moura | |
| | | | H04W 4/024 |
| 2017/0221069 A1 * | 8/2017 | Remboski | G07C 5/0825 |
| 2018/0053405 A1 * | 2/2018 | de Azevedo | G08G 1/123 |
| 2019/0039545 A1 * | 2/2019 | Kumar | G07C 5/008 |
| 2019/0213429 A1 * | 7/2019 | Sicconi | G06F 3/0346 |
| 2019/0213808 A1 | 7/2019 | Bellrose et al. | |
| 2019/0318267 A1 * | 10/2019 | Zhang | G06F 30/15 |
| 2019/0340519 A1 * | 11/2019 | Bender | G07C 5/085 |
| 2019/0369637 A1 * | 12/2019 | Shalev-Shwartz | G05D 1/0251 |
| 2020/0017117 A1 * | 1/2020 | Milton | G07C 5/008 |
| 2020/0057487 A1 * | 2/2020 | Sicconi | G06N 20/00 |
| 2021/0215491 A1 * | 7/2021 | Liu | G06Q 50/40 |
| 2022/0114560 A1 * | 4/2022 | Senzer | G07C 5/085 |

FOREIGN PATENT DOCUMENTS

| | | | | |
|---|---|---|---|---|
| WO | WO2008021244 A2 * | 2/2008 | | G06F 21/22 |
| WO | WO2015017711 A1 * | 2/2015 | | G05B 19/418 |
| WO | WO2016151554 A1 * | 9/2016 | | B60W 40/08 |
| WO | WO2017120336 A2 * | 7/2017 | | G01C 21/34 |
| WO | WO2017142536 A1 * | 8/2017 | | G01C 21/34 |
| WO | WO2019185659 A1 * | 10/2019 | | G07C 5/08 |

OTHER PUBLICATIONS

M. V. Martínez, I. Del Campo, J. Echanobe and K. Basterretxea, "Driving Behavior Signals and Machine Learning: A Personalized Driver Assistance System," 2015 IEEE 18th International Conference on Intelligent Transportation Systems, 2015, pp. 2933-2940, doi: 10.1109/ITSC.2015.470. (Year: 2015).*

Prytz, R. (2014). Machine learning methods for vehicle predictive maintenance using off-board and on-board data (Licentiate dissertation, Halmstad University Press). Retrieved from http://urn.kb.se/resolve?urn=urn:nbn:se:hh:diva-27869 (Year: 2014).*

Patrick Tchankue, Janet Wesson, and Dieter Vogts. 2013. Using machine learning to predict the driving context whilst driving. In Proceedings of the South African Institute for Computer Scientists and Information Technologists Conference (SAICSIT '13). (Year: 2013).*

Spiric, G. (2014). Algorithm evaluation for road anomaly detection and wear estimation on trucks using an accelerometer (Dissertation). Retrieved from https://urn.kb.se/resolve?urn=urn:nbn:se:kth:diva-163715 (Year: 2014).*

Zaabar, Imen, and Karim Chatti. "Identification of localized roughness features and their impact on vehicle durability." HVTT11, International Heavy Vehicle Symposium: Balancing Competing Needs in Heavy Vehicle Transport Technology. 2010 (Year: 2010).*

* cited by examiner

Malfunction identification module 630

Receiving reports of exceptional events 6302

Collecting sensory data from a time period prior to and up to the occurrence of the event 6304

Collecting sensory data from the point in time at which the event occurred and after for a pre-defined period of time 6306

Comparing the sensory data collected prior to the occurrence of the driving event and the sensory data collected after the event 6308

Identifying the difference between the sensory data collected prior to the occurrence of the event and the sensory data collected at the end of the event, and comparing such difference to the difference in sensory data collected in two "normal" periods of time where no event(s) are identified 6310

Analyzing the identified exceptional sensory data, associating such data with malfunction(s), and storing such data for aiding in future predictions of malfunctions 6312

Using stored sensory data associated with various malfunctions to create an AI model III for identifying future malfunctions based on sensors data relating identification of driving events 6314

Using the model III for identifying malfunctions based on identified difference between the sensory data in relation to identified events 6316

In case of an exceptional change, tracking the identified change related sensor data to identify further changes 6318

SYSTEM AND METHOD FOR MONITORING AND PREDICTING BREAKDOWNS IN VEHICLES

FIELD OF THE INVENTION

The present invention relates to systems and methods for monitoring defects/failures of vehicles. More specifically, the present invention relates to computerized systems and methods that provide a continuous monitoring of the vehicle.

BACKGROUND OF THE INVENTION

With the high usage frequency of vehicles, failures/breakdowns occur frequently. Usually, when part(s) of the vehicle fail(s), the auto technician determines the types and reasons of the failures and brings out measures to solve them based on his knowledge and experience. The manual method involves trial and error processes which are stressful and time consuming, in addition, such manual method may lead to wearing and tearing of mechanical parts and to serious damages.

Thus, an aim of the present invention is to provide a computerized vehicle-monitoring system and method which provide a continuous monitoring of the vehicle for diagnostics, maintenance, and repair.

SUMMARY OF THE INVENTION

In accordance with some embodiments there is provided a method for condition monitoring a vehicle and for alerting of irregularities/defects.

The method comprises the steps of:
monitoring sensory data from multiple sensors;
collecting data continuously from said sensors;
processing said data;
applying machine learning algorithms at an online remote server configured to incorporate all the acquired sensory data and
providing an output sending/receiving a notification of a malfunction event;
  wherein applying said machine learning algorithms comprising applying at least one of the following models:
    (a) model I—trained to learn the behavior of said acquired sensory data and to identify malfunction(s) based on said sensory data;
    (b) model II—trained to learn the behavior of said acquired sensory data and to identify an exceptional event based on said sensory data and optionally based on human feedback; and
    (c) model III—trained to learn the behavior of said acquired sensory data and to identify upcoming malfunctions based on said sensory data.

The preset invention provides a method for monitoring condition of a vehicle and for alerting of irregularities/defects said method implemented by one or more processing devices operatively coupled to a non-transitory storage device, on which are stored modules of instruction code that when executed cause the one or more processing devices to perform:
  monitoring and continuously collecting sensory data from multiple type of sensors located at different location of the vehicle;
  applying at least one machine learning algorithm at an online remote server configured for identifying at least one expositional driving event and/or malfunction based on all the acquired sensory data and
providing an output notification of a malfunction event or driving event.
According to some embodiments of the present invention the method further comprising managing the schedule for future maintenance at the service provider based on received alerts of malfunction or driving event and sending/receiving schedules and/or costs for vehicle future maintenance at a service provider.
According to some embodiments of the present invention applying at least one machine learning algorithm include at least two machine learning algorithm
  a first algorithm configured to trained to learn the behavior of said acquired sensory data and to identify an exceptional driving event based on said sensory data
  second algorithm configured to learn the behavior of said acquired sensory data and identified exceptional event to identify malfunctions based on said sensory data and identified exceptional event.
According to some embodiments of the present invention the driving event is detected by identifying sudden exceptional changes during a short period of time in at least one sensor, comparing the sensor data with the sudden exceptional changes to stored known patterns of sensor data which represent a driving event and determining the occurrence of an exceptional event type based on identified changes in sensor data, the pattern of noise which matches the measurement with the sudden change, and thus, determining the scenario(s) causing the sudden change.
According to some embodiments of the present invention the learning algorithm machine learning algorithm trained to learn the behavior of said acquired sensory data and to identify upcoming malfunctions based on said sensory data by creating an additional AI model which correlating identified malfunction and identifiable via sensory data with the maintenance operation required for overcoming the malfunction.
According to some embodiments of the present invention the learning algorithm for identifying malfunctions is based on identifying the difference between the sensory data collected prior to the occurrence of the driving event and the sensory data collected at the end of the driving event, and comparing such difference to the difference in sensory data collected in two "normal" periods of time where no event is identified.
According to some embodiments of the present invention the training learning algorithm is further based on human feedback.
According to some embodiments of the present invention the method further comprising the steps of:
Identifying correlations of data receivable via multiple sensors;
Collecting sensory data during a pre-defined period of time and creating behavior pattern models of a vehicle based on various behavior characteristics including speed, acceleration, geo data and the like;
creating normal behavior AI model of vehicle technical behavior, based on a correlation of sensory data.
According to some embodiments of the present invention the method further comprising the steps of: Analyzing exceptional behavior changes of the vehicle based on "normal" behavior patterns of normal behavior AI model and configured to determine reporting mechanism by using predefined domain specific rules for based on the severity of exceptions, classifications of malfunctions and user preferences The present invention provides a system for monitoring condition of a vehicle and for alerting of irregularities/defects said system implemented by one or more processing devices operatively coupled to a non-transitory storage device, on which are stored modules comprising:

sensor processing module for monitoring sensory data from multiple type of sensors located at different location of the vehicle and collecting data continuously from said sensors;

malfunction identification module configured to apply at least one machine learning algorithm at an online remote server configured for identifying at least one expositional driving event and/or malfunction based on all the acquired sensory data and providing an output notification of a malfunction event or driving event.

According to some embodiments of the present invention the system further service provider application comprising managing the schedule for future maintenance at the service provider based on received alerts of malfunction or driving event and sending receiving schedules and/or costs for vehicle future maintenance at a service provider.

According to some embodiments of the present invention the system comprise at least two machine learning algorithm
- a first algorithm configured to trained to learn the behavior of said acquired sensory data and to identify an exceptional driving event based on said sensory data
- second algorithm configured to learn the behavior of said acquired sensory data and identified exceptional event to identify malfunctions based on said sensory data and identified exceptional event.

According to some embodiments of the present invention the system comprises another machine learning algorithm trained to learn the behavior of said acquired sensory data and to identify upcoming malfunctions based on said sensory data by creating an additional AI model which correlating identified malfunction and identifiable via sensory data with the maintenance operation required for overcoming the malfunction.

According to some embodiments of the present invention the learning algorithm for identifying malfunctions is based on identifying the difference between the sensory data collected prior to the occurrence of the driving event and the sensory data collected at the end of the driving event, and comparing such difference to the difference in sensory data collected in two "normal" periods of time where no event(s) are identified.

According to some embodiments of the present invention the system further comprising event identification module configured to identify driving event by identifying sudden exceptional changes during a short period of time in at least one sensor, comparing the sensor data with the sudden exceptional changes to stored known patterns of sensor data such as of noise data or acceleration data which represent a driving event and determining the occurrence of an exceptional event type based on identified changes in sensor data, the pattern of noise which matches the measurement with the sudden change, and thus, determining the scenario(s) causing the sudden change.

According to some embodiments of the present invention the training learning algorithm is further based on human feedback.

According to some embodiments of the present invention the malfunction identification module is further configured to identify correlations of data receivable via multiple sensors, collect sensory data during a predefined period of time and creating behavior pattern models of a vehicle based on various behavior characteristics including speed, acceleration, geo data and the like and creating normal behavior AI model of vehicle technical behavior, based on a correlation of sensory data.

According to some embodiments of the present invention the is malfunction detection module is further configured to analyze exceptional behavior changes of the vehicle based on "normal" behavior patterns of normal behavior AI model and determine reporting mechanism by using predefined domain specific rules based on the severity of exceptions, classifications of malfunctions and user preferences.

Furthermore, in accordance with some embodiments, the method further comprises sending/receiving schedules/costs for vehicle future maintenance at a service provider.

DESCRIPTION OF THE DRAWINGS

Vehicle condition monitoring allows the driver, and support personnel to become aware of irregularities/defects in the vehicle. They can take proactive steps to repair the defect/replace the defective component or to substitute the vehicle.

In accordance with some embodiments of the present invention, condition monitoring includes engine diagnostics, fuel, oil, brake fluid, water levels, status of Intelligent Transportation System (ITS) equipment, and the like.

The advantages of the vehicle monitoring system of the present invention is two-fold:
the system improves the response time to equipment defects/failure and vehicle breakdown, and
the system identifies vehicles with critical conditions prior to the occurrence of serious damage.

Figure 1:
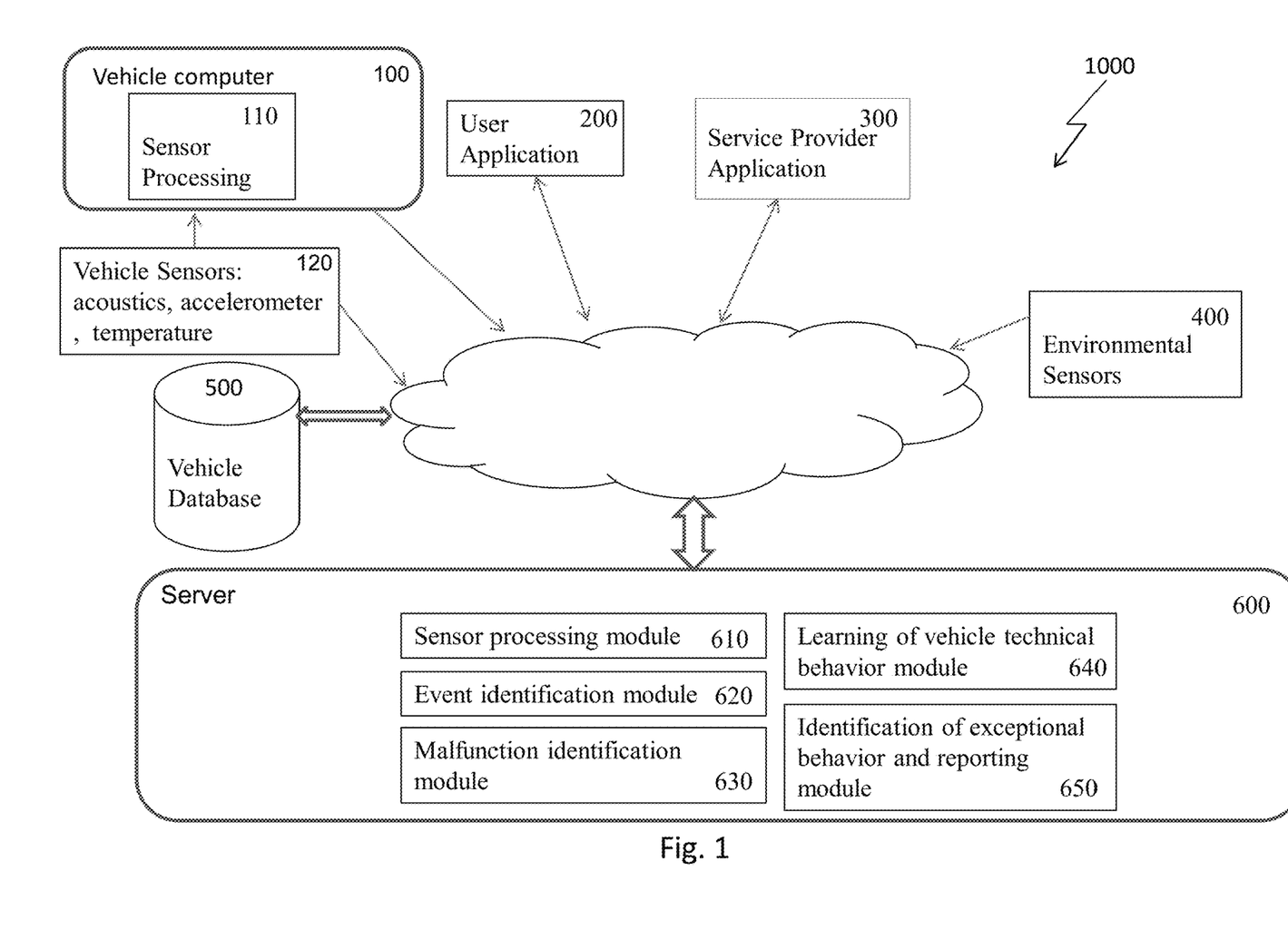

FIG. 1 is a block diagram, depicting an overview of a vehicle monitoring system 1000 for monitoring a vehicle in order to find irregularities/defects, and/or predict failures in accordance with some embodiments of the present invention.

Vehicle monitoring system 1000 comprises on-board components integrated in a vehicle. Such components include a vehicle computer 100 and vehicle sensors 120 which are used to monitor various car components and identify various irregularities and defects. For instance, sensors 120 may identify variations in performance resulting from faults and/or wear in mechanical components such as springs, shafts, steering system and the like.

Vehicle monitoring system 1000 further comprises a user application 200, a service provider application 300, environmental sensors 400, a vehicle database 500 and a server 600.

In accordance with some embodiments of the present invention, server 600 comprises a sensor processing module 610, an event identification module 620, a malfunction identification module 630, learning of vehicle technical behavior 640, and exception, identification, and reporting module 650.

It should be noted that the number of the active devices, i.e., the number of control units, sensors and the like in vehicle monitoring system 1000 may vary depending upon the desired application.

Server 600 comprises machine learning algorithms for analyzing sensory data together with data entered via the user application 200 and/or by a service provider application 300.

In accordance with some embodiments of the present invention, the on-board components integrated in a vehicle, i.e., the user application 200, the service provider application 300, and the server 600 communicate via wireless communication, e.g., via or Bluetooth, or a combination thereof.

Figure 2:
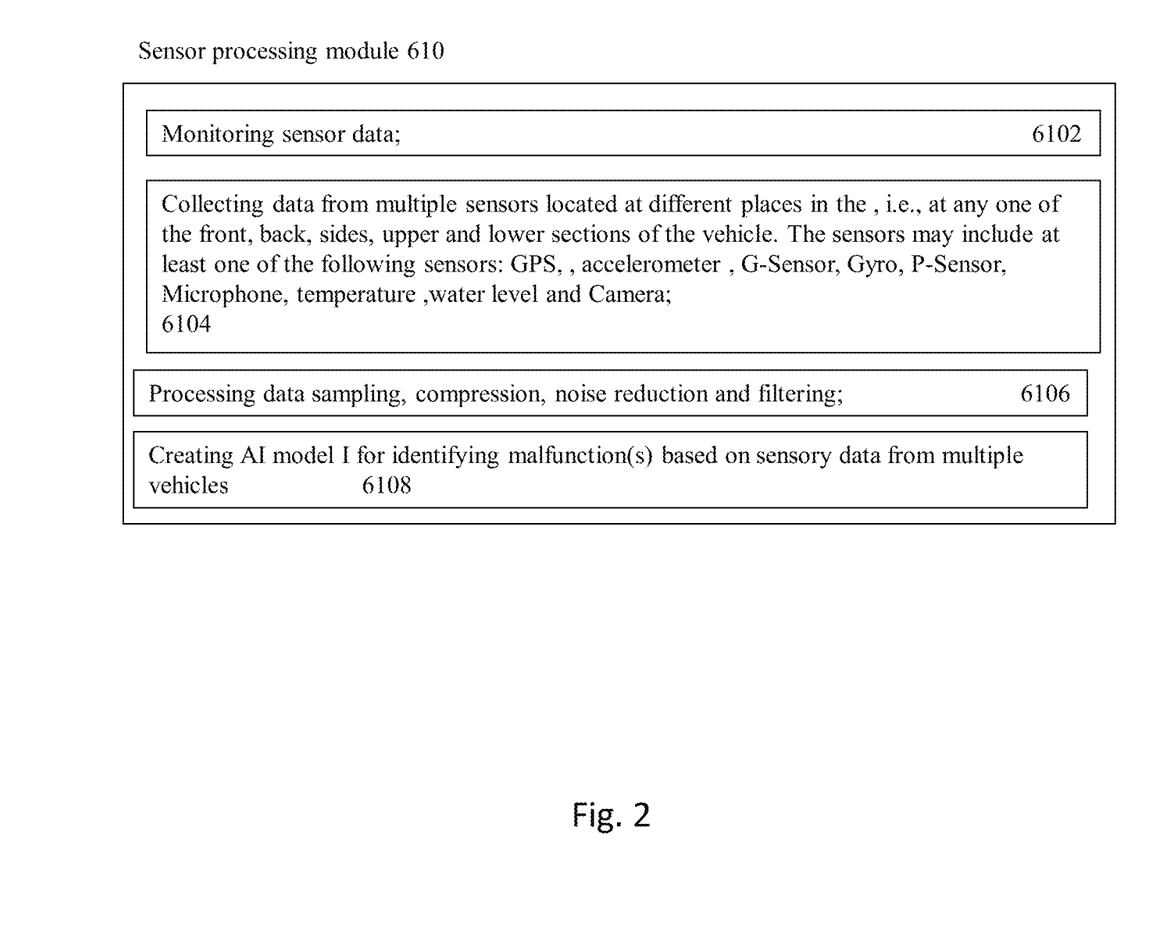

FIG. 2 is a flow diagram depicting the functionality of the sensor processing module 610 in accordance with some embodiments of the present invention.

The sensor processing module 610 resides within the server 600 and is responsible for the following:

monitoring sensor data [6102].

The sensor processing module 610 collects data continuously via multiple sensors positioned at various places within the vehicle, i.e., at any one of the front, back, sides, upper and lower sections of the vehicle. The sensors may include at least one of the following sensors: GPS, G-Sensor, Gyro, P-Sensor, Microphone, and Camera [6104], and the sensory data may be collected continuously during multiple events, such as, for instance, while driving uphill, downhill, on a flat road and the like.

The sensor processing module 610 is further responsible for (a) processing data sampling, e.g., to select, manipulate and analyze a representative subset of data points to identify patterns and trends in the larger data set being examined, (b) for data compression in order to save storage capacity, speed up data transfer and the like, and (c) for filtering the sensors signals—for reducing/removing noise from the sensors signals [6106].

Based on the continuous input from the multiple sensors from multiple vehicles, sensor processing module 610 creates an artificial intelligence (AI) model I for identifying malfunction(s) based on sensory data. In accordance with some embodiments of the present invention, model I identifies patterns of noise not matching the historic noise patterns in normal driving mode, and generates alerts of possible types of malfunction(s) [6108].

Figure 3:
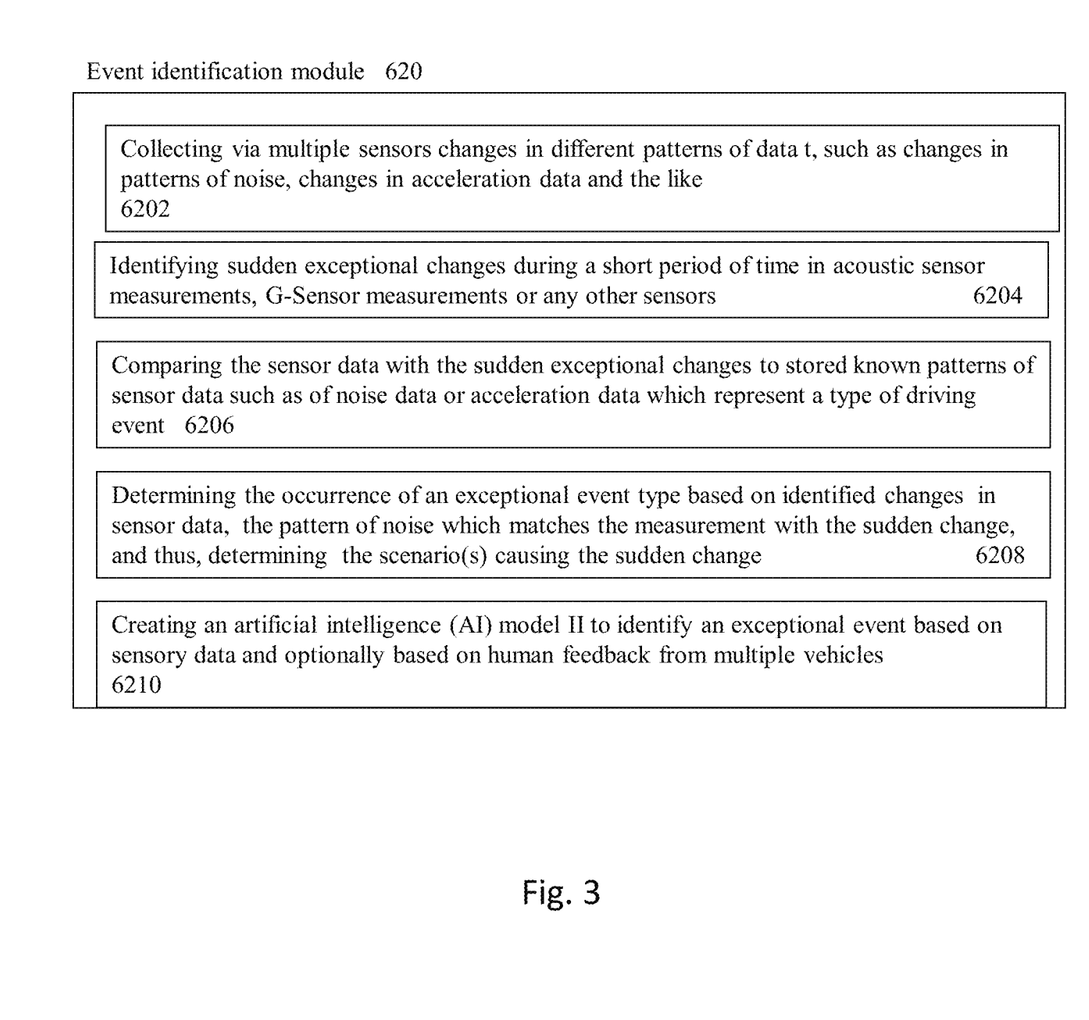

FIG. 3 is a flow diagram depicting the functionality of the event malfunction data module 620 in accordance with some embodiments of the present invention.

The event malfunction data module 620 resides within the server 600 and performs the following:

(a) collecting via multiple sensors different patterns of data to be correlated to specific event, such as for instance, changes in acceleration data, changes in patterns of noise—a noise pattern associated with driving on a bumpy road, a noise pattern associated with driving uphill, a noise pattern associated with driving downhill and the like [6202].

(b) identifying sudden exceptional changes during a short period of time in one or more sensors, such as acoustic sensor measurements, G-Sensor measurements or any other sensors [6204].

(c) comparing the sensor data with the sudden exceptional changes to stored known patterns of sensor data such as of noise data or acceleration data which represent specific type of driving event such as bumping against a sidewalk, driving on a bumpy road, driving over a pothole and the like [6206].

(d) Determining the occurrence of an exceptional driving event type based on identified changes in sensor data, the pattern of noise which matches the measurement with the sudden change, and thus, determining the scenario(s) of driving events causing the sudden change [6208], and (e) Creating an artificial intelligence (AI) model II to identify an exceptional event based on sensory data and optionally based on human feedback [6210].

Using steps (a)-(d) for collecting and analyzing data of noise patterns associated with various scenarios. Using the data of noise patterns associated with various scenarios to create an artificial intelligence (AI) model II able to identify an exceptional event based on sensory data and optionally based on human feedback, by enabling user provide information on events occurring during his driving.

Figure 4:
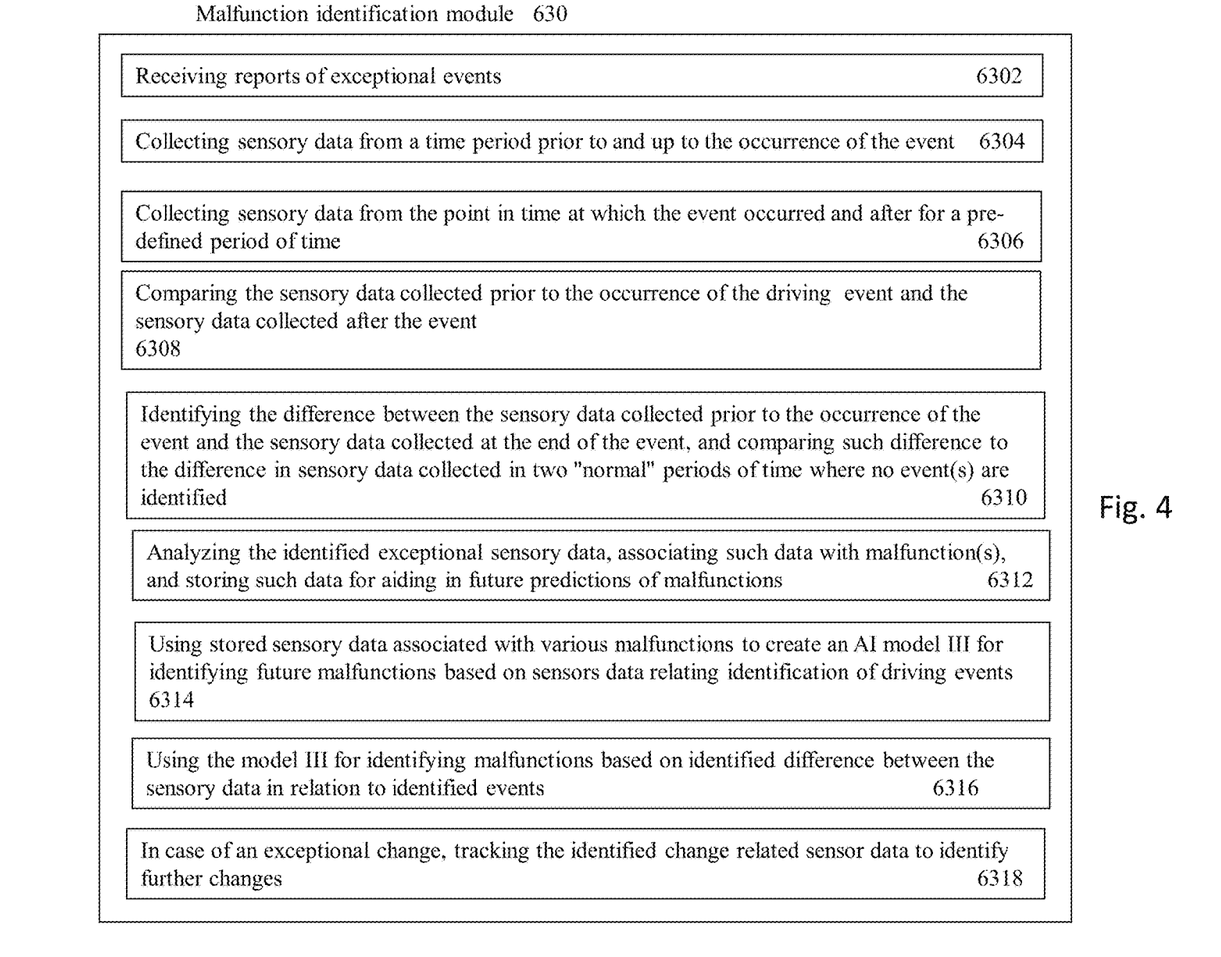

FIG. 4 is a flow diagram depicting the functionality of the malfunction identification module 630 in accordance with some embodiments of the present invention.

The malfunction identification module 630 resides within the server 600 and is responsible for the following:

Receiving reports of exceptional event(s) via at least one sensor [6302].

Collecting sensory data from a time period prior to and up to the occurrence of the event [6304].

Collecting sensory data from the point in time at which the event occurred and after for a pre-defined period of time [6306].

Comparing the sensory data collected prior to the occurrence of the event and the sensory data collected after the event [6308].

Identifying the difference between the sensory data collected prior to the occurrence of the event and the sensory data collected at the end of the event, and comparing such difference to the difference in sensory data collected in two "normal" periods of time where no event(s) are identified [6310].

Analyzing the identified exceptional sensory data, associating such data with malfunction(s), and storing such data for aiding in future predictions of malfunctions [6312].

Using stored sensory data associated with various malfunctions to create an AI model III for identifying future malfunctions based on exceptional sensory data relating identified driving events [6314].

Using the model III for identifying malfunctions [6316] based on identified difference between the sensory data in relation to identified events from multiple vehicles.

In case of an exceptional change, tracking the identified change related sensor data to identify further changes [6318].

Figure 5:
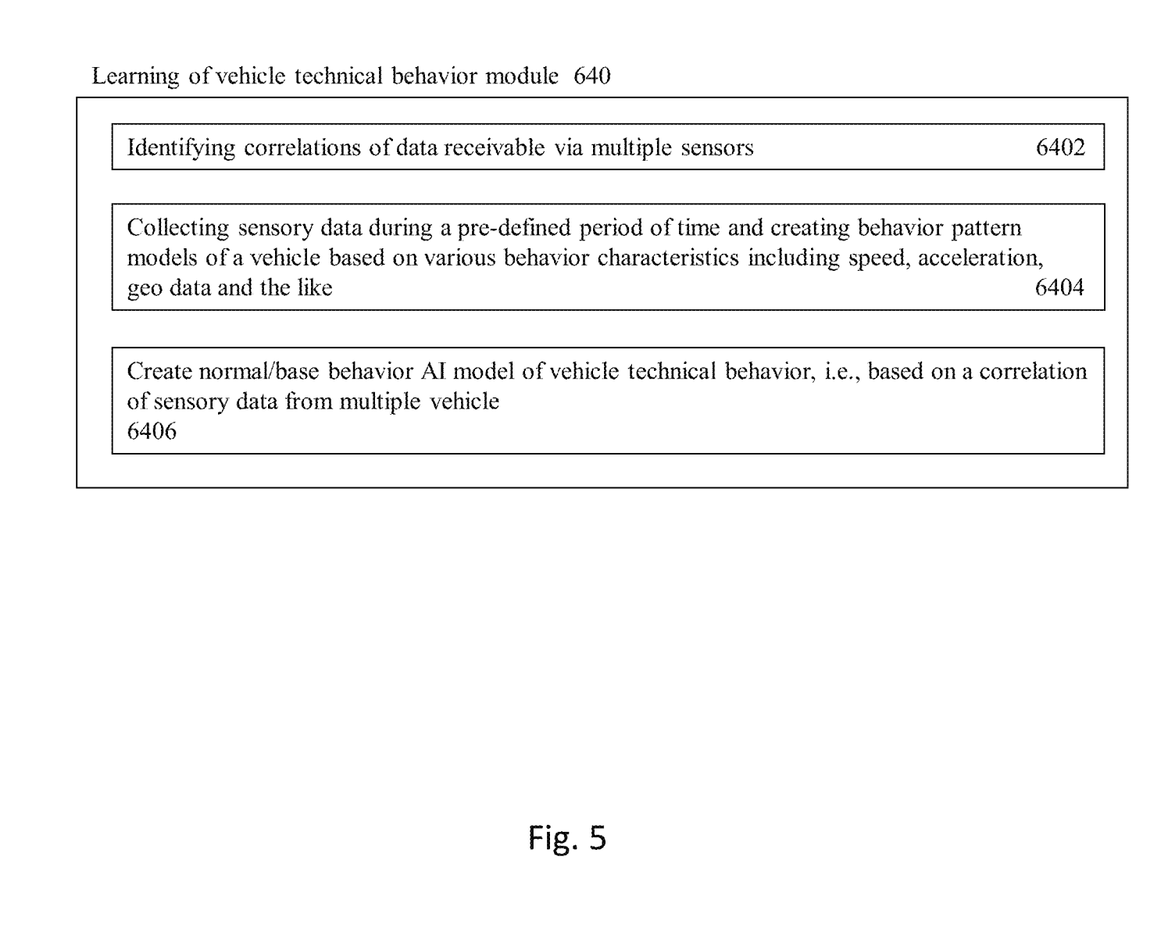

FIG. 5 is a flow diagram depicting the functionality of the learning of vehicle technical behavior module 640 in accordance with some embodiments of the present invention.

The learning of vehicle technical behavior module 640 resides within the server 600 and is responsible for the following:

identifying correlations of data receivable via multiple sensors, for instance, a correlation between a water level sensor indicating a low water level, and a temperature sensor indicating an exceptional temperature increase may indicate a malfunction [6402].

collecting sensory data during a pre-defined period of time and creating behavior pattern models of from multiple vehicles based on various behavior characteristics including speed, acceleration, geo data and the like [6404].

creating an AI model IV able to identify an exceptional event based on a correlation of sensory data [6406].

Figure 6:
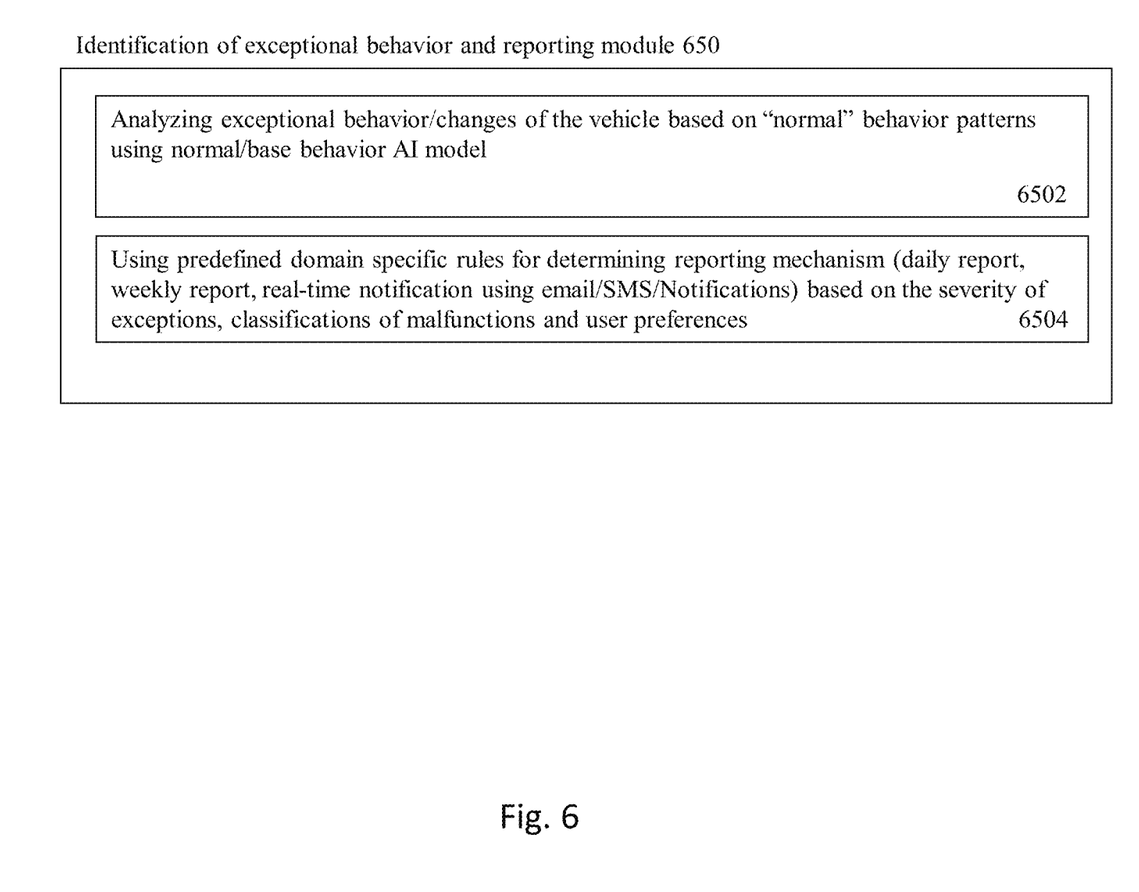

FIG. 6 is a flow diagram depicting the functionality of the identification of exceptional behavior and reporting module 650 in accordance with some embodiments of the present invention.

In accordance with some embodiments of the present invention, module 650 analyzes exceptional behavior/changes of the vehicle based on "normal" behavior patterns [6502].

The module 650 uses predefined domain specific rules for determining reporting mechanism, i.e., daily report, weekly report, real-time notification using email/SMS/Notifications based on the severity of exceptions, classifications of malfunctions and user preferences [6504].

Figure 7:
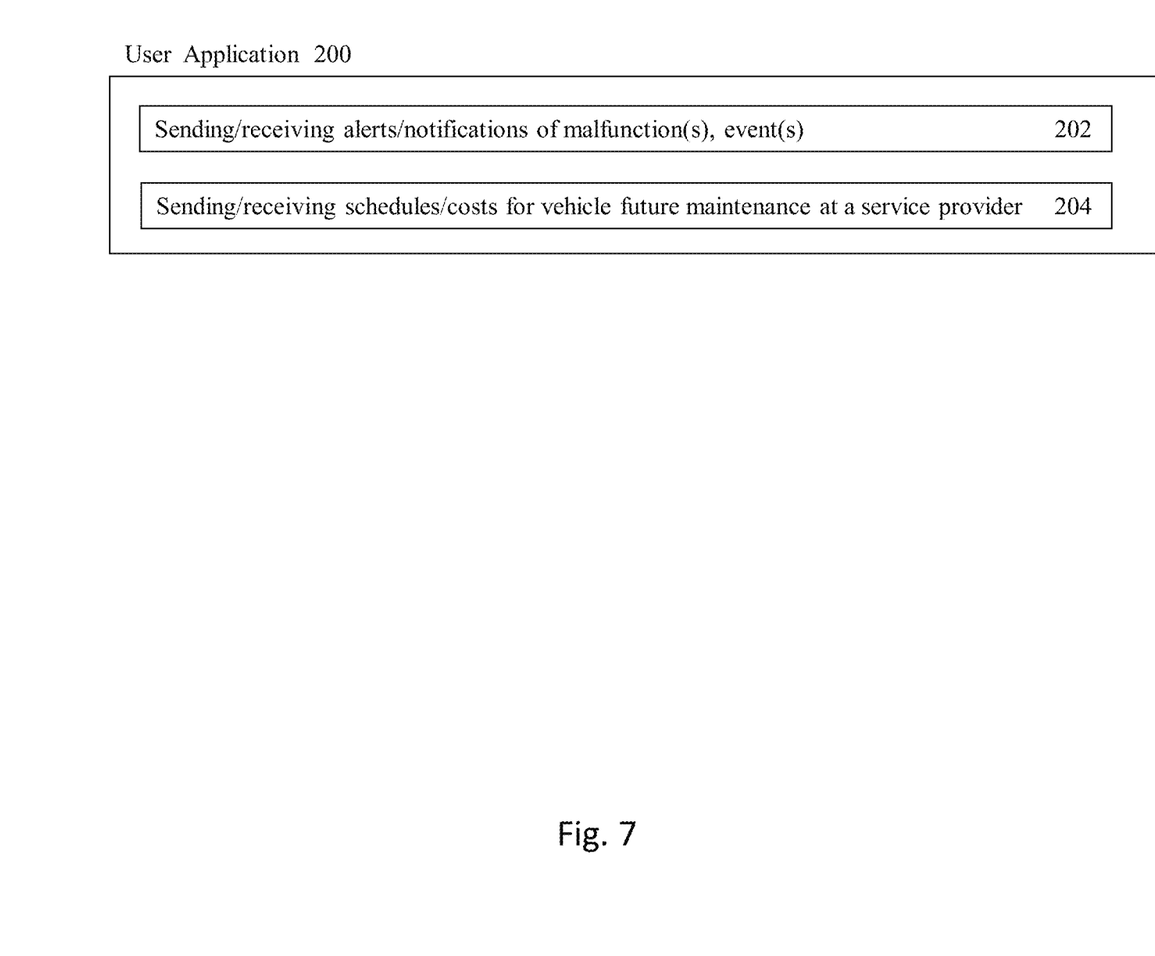

FIG. 7 is a flow diagram depicting the functionality of the user application 200 in accordance with some embodiments of the present invention.

In accordance with some embodiments of the present invention, the user application 200 sends/receives alerts/notifications of malfunction(s) [202].

In addition, the user application 200 provides/receives schedules/costs for vehicle future maintenance at a service provider [204].

Figure 8:
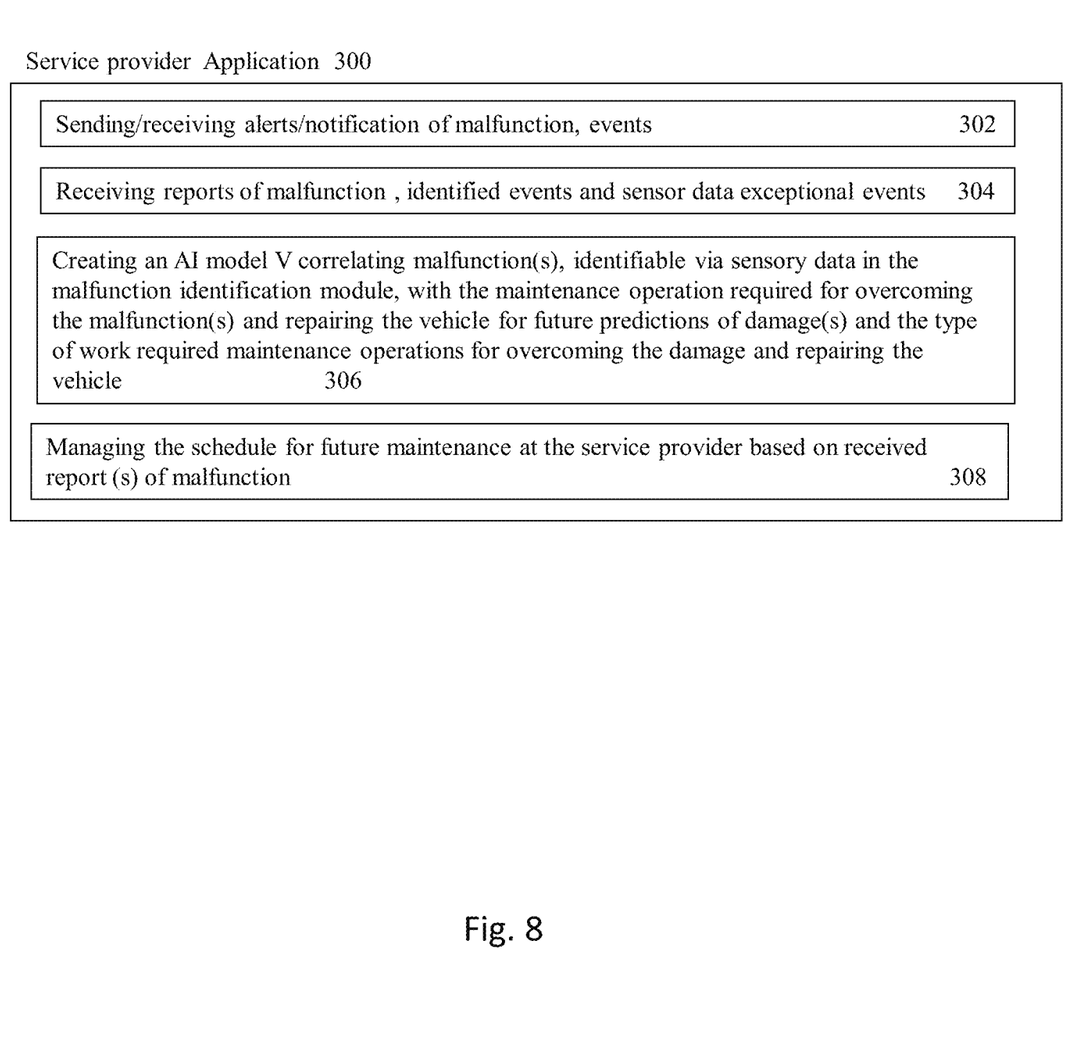

FIG. 8 is a flow diagram depicting the functionality of the service provider application 300 in accordance with some embodiments of the present invention.

In accordance with some embodiments of the present invention, the service provider application 300 sends/receives alerts/notifications of malfunction(s) [302].

Receiving reports of malfunction, identified events and sensor data exceptional events [304].

In addition, the service provider application 300 creates an AI model V correlating malfunction(s), which is/are identifiable via sensory data in the malfunction identification module, with the maintenance operation required for overcoming the malfunction(s) and repairing the vehicle for future predictions of damage(s) and the type of work required for overcoming the damage and repairing the vehicle [306].

The service provider application 300 further manages the schedule for future maintenance at the service provider based on received report(s) of malfunction [308].

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer usable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

The invention claimed is:

1. A method for monitoring vehicles, each vehicle comprising one or more sensors of one or more sensor types, said method comprising at least:

providing at least one online remote server configured to receive sensor data from sensors of each of the vehicles;

applying at least one event-identification machine learning algorithm using an event-identification module, operable at the at least one online remote server, the event-identification machine learning algorithm being configured at least to identify occurrence of driving events of each vehicle and a type of each driving event, related to vehicle behavior, wherein the type of each driving event is at least one of: bumping against a sidewalk, driving over a bump, driving over a pothole, based on analysis of accumulated and acquired sensor data from sensors of the vehicles;

wherein occurrence of each driving event and the type of each driving event is detected by identifying sudden exceptional changes during a short period of time in at least one sensor of a specific vehicle;

wherein determining the occurrence of each driving event and the type of each driving event by identifying sudden exceptional changes is based on comparing a pattern of the sensor data to stored known patterns of sensor data that are associated with the type of each driving event; and applying at least one malfunction-identification machine learning algorithm, using a malfunction identification module, the malfunction identification module being configured at least to identify one or more malfunctions, to identify relations between identified occurrences of driving events of an identified type and identified malfunctions of each of the vehicles and to predict one or more future malfunctions for the specific vehicle, based at least on analysis of acquired and accumulated sensor data from sensors from all vehicles and based on relations between identified events and identified malfunctions;

wherein the learning algorithm for identifying malfunctions is based on identifying a difference between sensor data collected prior to the occurrence of the driving event and sensor data collected after the occurrence of the driving event, and comparing such difference to a difference in sensor data collected in two periods of time where no event is identified;

determining required maintenance operations for the specific vehicle and determining schedules of the determined maintenance operations for the specific vehicle, based on ongoing identified one or more events of the specific vehicle and their related one or more predicted future malfunctions; and output alerts indicative of: predicted malfunctions, determined required maintenance operations and their respective determined schedule, for reducing or preventing predicted malfunctions.

2. The method of claim 1, wherein at least some of the alerts relating to each specific vehicle are sent to at least one service provider of the specific vehicle by the at least one online remote server.

3. The method of claim 1, wherein at least some of the malfunctions of each vehicle are identifiable by identification of normal behavior of said acquired sensory data of the specific vehicle and identification of exceptional events of the specific vehicle, based on identification of sensory data of the specific vehicle that deviates from normal behavior of the sensory data of the specific vehicle.

4. The method of claim 1, further comprising receiving human feedback for at least one of the vehicles and using the human feedback of each specific vehicle to identify malfunctions and/or determine schedule of maintenance operations also based on the received human feedback.

5. The method of claim 1 further comprising the steps of:

identifying correlations between sensory data receivable from multiple sensors and different sensor types of each vehicle and from multiple sensors of the same type received from different vehicles;

collecting sensory data during a pre-defined period of time and creating behavior pattern models of each vehicle based on various behavior characteristics including at least speed and/or acceleration related sensory data;

creating normal behavior AI model of vehicle technical behavior of each vehicle, based on correlations of sensory data.

6. The method of claim 5 further comprising the steps of: analyzing exceptional behavior changes of the vehicle based on normal behavior patterns of normal behavior AI model and configured to determine reporting mechanism by using predefined domain specific rules for based on the severity of exceptions, classifications of malfunctions and user preferences.

7. The method of claim 1 further comprising estimating and outputting cost of determined maintenance operations.

8. A system for monitoring vehicles, each vehicle having multiple sensors of multiple sensor types, the system comprising at least:
- an online remote server configured to receive sensor data from sensors of each of the vehicles, the online remote server comprising at least;
    - (i) at least one event-identification machine learning algorithm using an event-identification module, operable at the at least one online remote server, the event-identification machine learning algorithm being configured at least to identify occurrence of driving events of each vehicle and a type of each driving event, related to vehicle behavior wherein the driving event is at least one of: bumping against a sidewalk, driving over a bump, driving over a pothole, based on analysis of accumulated and acquired sensor data from sensors of the vehicles;
- wherein occurrence of each driving event and the type of each driving event is detected by identifying sudden exceptional changes during a short period of time in at least one sensor of a specific vehicle;
- wherein determining the occurrence of each driving event and the type of each driving event by identifying sudden exceptional changes is based on comparing a pattern of the sensor data to stored known patterns of sensor data that are associated with the type of each driving event; and
    - (ii) at least one malfunction-identification machine learning algorithm, using a malfunction identification module, the malfunction identification module being configured at least to:
        - identify one or more malfunctions, to identify relations between occurrence of identified events of an identified type and identified malfunctions of each of the vehicles;
        - predict one or more future malfunctions for the specific vehicle, based at least on analysis of acquired and accumulated sensor data from sensors from all vehicles and based on relations between identified events and identified malfunctions;
- wherein the learning algorithm for identifying malfunctions is based on identifying a difference between sensor data collected prior to the occurrence of the driving event and sensor data collected after the occurrence of the driving event, and comparing such difference to a difference in sensor data collected in two periods of time where no event is identified;
        - determine required maintenance operations for the specific vehicle and schedules of the determined maintenance operations for the specific vehicle, based on ongoing identified one or more events of the specific vehicle and their related one or more predicted future malfunctions; and
        - output alerts indicative of: predicted malfunctions, determined required maintenance operations and their respective determined schedule.

9. The system of claim 8, further comprising a service provider application installable a user device associated with one or more of the vehicles, the service provider application being configured for communicating with the online remote server and for managing the schedules for future maintenance operations of vehicles, based on received alerts of predicted malfunction and associated determined future maintenance operations and their schedules.

10. The system of claim 8, wherein at least some of the malfunctions of each vehicle are identifiable by identification of normal behavior of said acquired sensory data of the specific vehicle and identification of exceptional events of the specific vehicle, based on identification of sensory data of the specific vehicle that deviates from normal behavior of the sensory data of the specific vehicle.

11. The system of claim 8, wherein the online remote server is further configured for receiving human feedback for at least one of the vehicles and using the human feedback of each specific vehicle to identify malfunctions and/or determine schedule of maintenance operations also based on the received human feedback.

12. The system of claim 8, wherein the online remote server is further configured to:
- Identify correlations between sensory data receivable from multiple sensors od different sensor types of each vehicle and from multiple sensors of the same type received from different vehicles;
- collect sensory data during a pre-defined period of time and create behavior pattern models of each vehicle based on various behavior characteristics including at least speed and/or acceleration related sensory data;
- create normal behavior AI model of vehicle technical behavior of each vehicle, based on correlations of sensory data.

13. The system of claim 12, wherein the identification of exceptional behavior of each vehicle is based on behavior patterns of normal behavior AI model and configured to determine reporting mechanism by using predefined domain specific rules for based on the severity of exceptions, classifications of malfunctions and user preferences.

14. The system of claim 8, wherein the online remote server is further configured to estimate cost of determined maintenance operations.

15. The system of claim 8, wherein at least one of the sensors in each vehicle comprises at least one microphone, and wherein the identification of events and identification and prediction of occurring and future malfunctions is further done by analyzing acoustic sensor data from the at least one microphone installed in each of the vehicles.

* * * * *